United States Patent [19]

Harding, Sr.

[11] Patent Number: 5,460,285

[45] Date of Patent: Oct. 24, 1995

[54] PRESSURE RELIEF VENTING LID

[75] Inventor: Robert A. Harding, Sr., Holly, Mich.

[73] Assignee: Clawson Tank Company, Clarkston, Mich.

[21] Appl. No.: 88,043

[22] Filed: Jul. 6, 1993

[51] Int. Cl.⁶ .......................... B65D 45/16; B65D 51/16; B65D 51/18

[52] U.S. Cl. ................... 220/203.1; 220/203; 220/231; 220/254; 220/326; 220/337; 220/203.06; 220/366.1

[58] Field of Search .................................. 220/203, 208, 220/231, 254, 320, 326, 337, 366

[56] References Cited

U.S. PATENT DOCUMENTS

| | | | |
|---|---|---|---|
| 1,311,957 | 8/1919 | Ferris | 220/208 |
| 2,776,070 | 1/1957 | Phillips | 220/203 |
| 3,074,588 | 1/1963 | Burdue | 220/231 |
| 3,147,881 | 9/1964 | Friend | 220/231 |
| 4,181,238 | 1/1980 | Arnold et al. | 220/314 |
| 4,218,967 | 8/1980 | Batchelor | 220/231 X |
| 4,768,675 | 9/1988 | Coleman | 220/203 |
| 5,042,677 | 8/1991 | Chen et al. | 220/201 |
| 5,111,955 | 5/1992 | Baker et al. | 220/303 |
| 5,135,024 | 8/1992 | Le Blanc et al. | 220/203 X |
| 5,242,069 | 9/1993 | Hertrampf | 215/260 |

OTHER PUBLICATIONS

Betts Industries, Inc., Jan. 1991, Section 84, pp. 2A, 2B.

Primary Examiner—Stephen J. Castellano
Assistant Examiner—Vanessa Caretto
Attorney, Agent, or Firm—Barnes, Kisselle, Raisch, Choate, Whittemore & Hulbert

[57] ABSTRACT

A pressure relief venting lid for sealing an opening and providing pressure regulation of a container. The lid has a support plate attached by four angularly spaced spring assemblies to a port cover for sealing a filler opening in a manway cover for the container. The support plate overlies the port cover for fixedly supporting the spring assemblies and cover while protecting the springs and cover from impact or shock. The spring assemblies are disposed between the support plate and port cover for sealing the cover against the opening and allowing the cover to unseat from the opening to regulate the pressure within the container. The spring assemblies are offset equal distances from the center of the port cover to minimize bending moments that the cover may be subjected to. The generally circular port cover has a convex dished portion for strengthening the port cover to maintain the seal with the opening while under load.

4 Claims, 3 Drawing Sheets

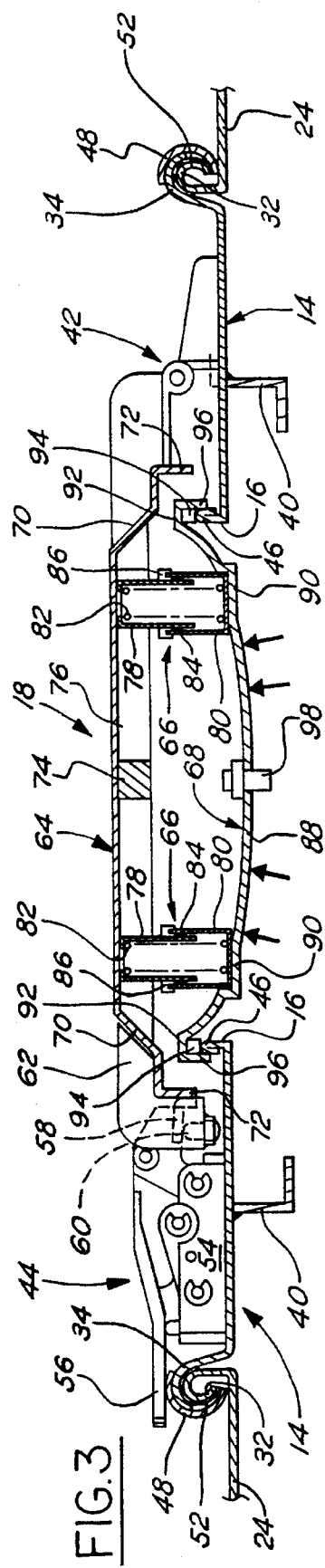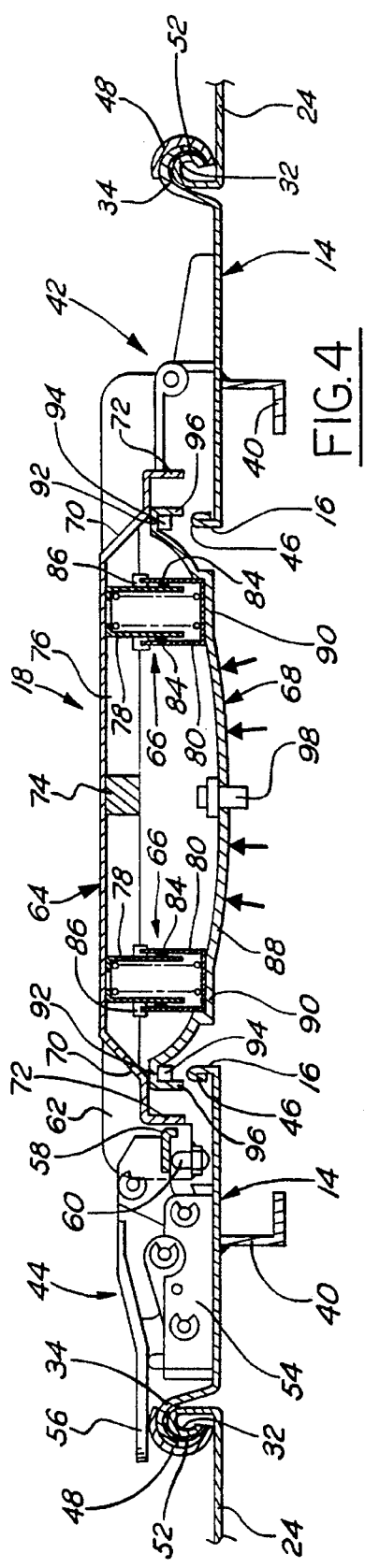

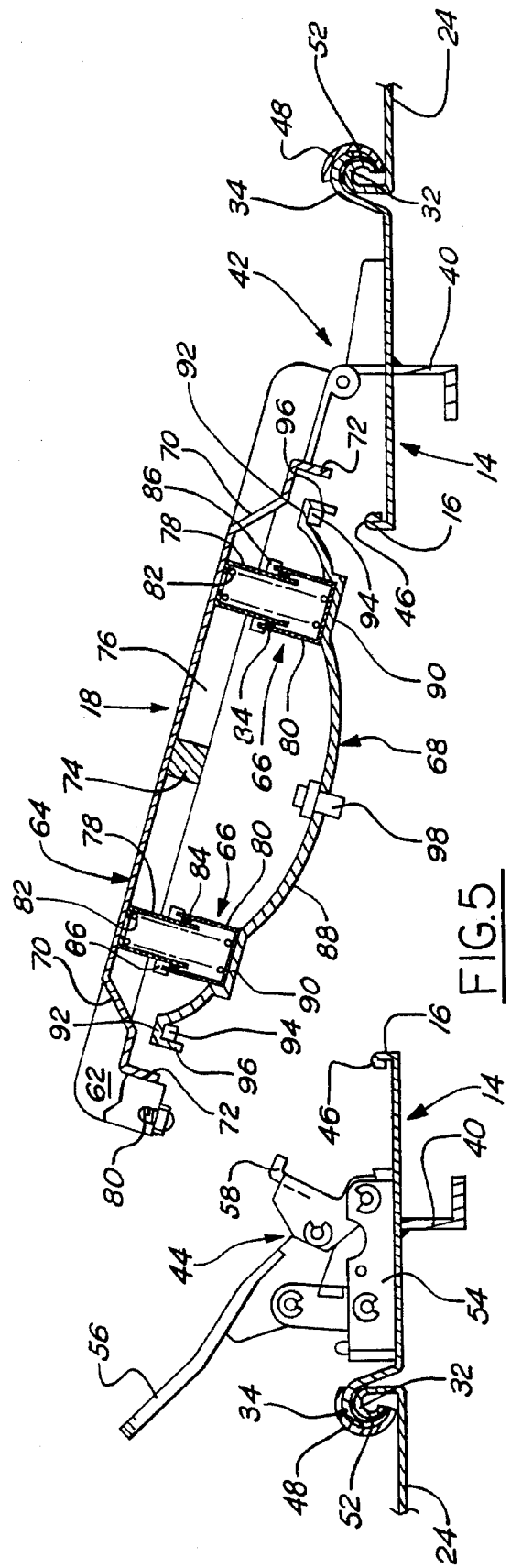

5,460,285

PRESSURE RELIEF VENTING LID

FIELD OF THE INVENTION

This invention relates to a lid for sealing an opening of a container and more particularly to a lid for sealing the opening and regulating pressure within the container.

BACKGROUND OF THE INVENTION

Lids which provide pressure relief venting of a container are used to seal containers holding material, especially liquids, which must be maintained at or below a desired pressure. Such lids have found widespread application in regulating the internal pressure of containers typically containing hazardous liquids which may be inflammable, volatile, acidic or even highly caustic.

As the number of containers carrying hazardous material being transported has increased, the desire to prevent environmentally damaging spills has led to the further development of lids which can provide pressure relief venting while also maintaining a fluid-tight seal when the container is dropped or collides with another object. These lids usually have a cover urged by a spring member against the container for sealing the container opening and maintaining the seal while being able to withstand a hydraulic shock of contents within the container impacting against the cover, yet allowing the seal to be broken to regulate pressure within the container.

A prior commonly known pressure relief venting lid has a substantially flat, generally circular port cover which is attached to a cross-arm supported by a piston. The piston is attached at one end to the center of the cover and at the opposite end to the cross-arm to urge the cover into sealing engagement over the container opening when the cover is secured over the opening. Typically, the cross-arm is hingedly mounted to allow the cover to be moved away from the opening to provide access to the interior of the container and may be clamped down when the cover is sealing the opening to support the cover. A finger extending from the cross-arm may be provided for engaging the cover to prevent the cover from rotating and unscrewing from the piston during use.

Unfortunately, while these lids may be designed to maintain a fluid-tight seal when subjected to the hydraulic shock of a short container drop, large bending moments created around the centrally located piston from liquid impacting the vent cover can cause the cover to unseat and spill contents from the container. Even worse, when exposed to a more severe shock, such as when a container is dropped from an even greater height, for example, of two feet or higher, these flat port covers tend to permanently deform thereby increasing the likelihood of an environmentally contaminating spill and typically rendering the lid unusable. Furthermore, these lids are ill-suited for complying with recent regulations which are more stringent, requiring a pressure relief venting lid secured to a container holding material having a specific gravity of 1.2 to survive a container drop of four feet while maintaining a fluid-tight seal.

Another problem with the aforementioned lids is that the top of the port cover is generally exposed and unprotected which can allow direct contact between the cover and another object during an accident possibly damaging the cover and/or causing a spill. This exposed design is also undesirable since it can allow escaping pressurized vapor to directly contact and injure a nearby worker during pressure relief venting or when the lid is being opened.

SUMMARY OF THE INVENTION

The pressure relief venting lid of this invention has a support plate attached by four spring assemblies to a port cover for sealing a fill port opening of an annular manway cover received over an opening of a container for regulating pressure within the container and maintaining a fluid-tight seal when the container is subjected to an impact or dropped. The support plate is hingedly connected to the manway cover and may be moved between a first closed position to place the port cover in sealing engagement over the fill port and a second open position allowing the container to be filled or the contents of the container to be removed or inspected.

The support plate supports the spring assemblies and the port cover and also overlies and protects the springs and port cover from impact or shock and shields nearby workers from vapor released from the container during venting or when the vent lid is being opened. The spring assemblies are disposed between the support plate and port cover of the vent lid for urging the port cover against the manway cover to seal the fill port when the lid is closed while allowing the port cover to controllably unseat from the opening when the pressure within the container reaches a predetermined value to regulate pressure within the container. The springs are offset from the center of the port cover to minimize the bending moments the port cover is subjected to during a hydraulic shock from the contents of the container impacting against the port cover. The springs are spaced around the port cover for more uniformly biasing the cover against the manway cover to better maintain the sealing of the fill opening. The port cover has a central convex dished portion for strengthening the cover to enable the cover to withstand hydraulic shock forces without flexing or otherwise deforming to maintain the seal with the fill port opening. If desired, a vent can be provided in the port cover to equalize pressure differences between the exterior and interior of the container to prevent a vacuum from forming within the container.

One object of this invention is to provide an improved pressure relief venting lid which is able to regulate the pressure within a container and maintain a fluid-tight seal with an opening of the container even when subjected to an impact with another object or a hydraulic shock from the container being dropped.

A feature of this invention is that the support plate overlies the port cover of the vent lid for protecting the cover from direct impact with another object while shielding nearby workers from vapor being released during pressure relief venting or when the vent lid is being opened.

Another object of this invention is to provide a port cover construction which is inherently strong and resistant to deformation.

A still another object of this invention is to provide a spring-biased port cover that is able to quickly and securely reseal the container opening should the seal be broken during a severe shock to prevent the container from spilling its contents.

A further object of the present invention is to provide spring assemblies which are offset from the center of the port cover to greatly reduce the magnitude of the bending moments the cover is subjected to during hydraulic shock to prevent deformation of the cover during impact and more positively maintain the seal with an opening of the container.

A still further object of the invention is to provide spring assemblies which are spaced along the periphery of the port cover to more uniformly press the cover into sealing engagement over an opening of the container to better seal the opening.

These and other objects and features of the invention will become more apparent as the following description proceeds, especially when considered with the accompanying drawings,

BRIEF DESCRIPTION OF THE DRAWINGS

FIG. 3 is a sectional view taken along line 3—3 of FIG. 1 illustrating the lid in a closed position sealing a fill port opening of a manway lid which is received over an opening of the container.

FIG. 4 is a sectional view of the lid showing a port cover of the lid unseating from the opening of the manway cover to regulate pressure within the container.

FIG. 5 is a sectional view of the lid illustrating the lid in an open position permitting access to the interior of the container for filling the container or to remove or inspect the contents of the container.

DETAILED DESCRIPTION OF THE INVENTION

Figure 1:
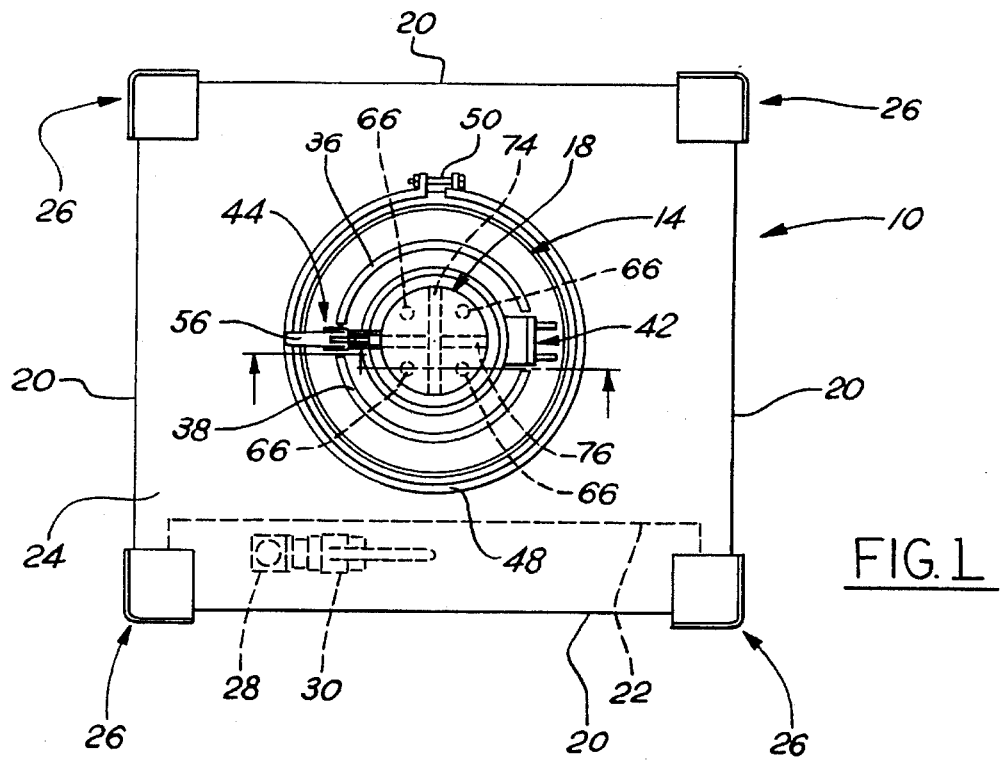
FIG. 1 is a top view of a container illustrating a pressure relief venting lid embodying this invention.

Referring now more particularly to the drawings, FIG. 1 illustrates a container 10 having a circular manway opening 12 for receiving an annular manway cover 14. Manway cover 14 has a circular fill port opening 16 sealed by a pressure relief vent lid 18 of this invention. Container 10 has generally rigid and continuous sidewalls 20, a generally rigid and continuous bottom wall 22, a generally rigid and continuous top wall 24, and a stacking pad 26 welded or otherwise attached to each corner of container 10. Container 10 is preferably supported by feet (not shown) depending from bottom wall 22 and has a discharge outlet 28 extending from bottom 22 with a valve 30 disposed at the free end of outlet 28 for permitting container 10 to be controllably emptied. Top wall 24 has an upstanding curled lip 32 encompassing manway opening 12 for generally coaxially registering and seating manway cover 14 over opening 12. Container 10 may be a tank, housing or other receptacle requiring pressure regulation.

Manway cover 14 has a mounting flange 34 bounding its periphery which registers with lip 32 of container 10 when cover 14 is closed over opening 12. Preferably, a pair of arcuate ribs 36 and 38 (FIGS. 1 and 2) are provided on the top surface of cover 14 and a generally cylindrical L-shaped rib 40 (FIGS. 3–5) is provided on the underside of cover 14 to stiffen and thereby strengthen cover 14. The vent lid 18 is attached to cover 14 by a hinge 42 enabling lid 18 to be moved between a closed position over fill opening 16 (FIG. 3) and an open position (FIG. 5) permitting the contents of container 10 to be added to, removed or inspected. A latch 44 is attached to cover 14 adjacent port 16 and opposite hinge 42 to secure vent lid 18 in closed position over port opening 16. Manway cover 14 also has an upwardly projecting lip 46 around the periphery of port opening 16 to provide a positive seal between cover 14 and vent lid 18 when lid 18 is closed over opening 16.

As is shown more clearly in FIGS. 3–5, mounting flange 34 of manway cover 14 is generally outwardly and downwardly curled for engaging over lip 32 of container 10 to center cover 14 over manway opening 12 and permit the cover to pivot between open and closed positions with respect to opening 12. To secure manway cover 14 over opening 12, a transversely split, C-shaped locking ring 48 is engaged around flange 34 and lip 32, and a bolt 50 joining both ends of ring 48 is tightened by a suitable tool until the desired cover-securing tension is achieved in ring 48. Preferably, a gasket 52 is disposed between flange 32 and lip 34 to provide a fluid-tight seal between cover 14 and container 10 when cover 14 is secured over opening 12 by ring 48.

Latch 44 has a base 54 affixed to cover 14 and a handle 56 linked to a catch 58 for engaging a boss 60 attached to vent lid 18 by a bracket 62. Handle 56 may be manipulated to bring catch 58 into engagement with boss 60, as is shown more clearly in FIGS. 3 and 4, to secure vent lid 18 in the closed position. Preferably, during latching, catch 58 draws vent lid 18 down into more positive engagement with lip 46 of manway cover 14 to ensure that fill port 16 is sealed fluid tight. To prevent latch 44 from inadvertently unlatching when securing lid 18 in the closed position, handle 56 may be retained in the latched position by a pin or other locking device (not shown). As is shown in FIG. 5, latch handle 56 may be released, disengaging catch 58 from boss 60, for enabling vent lid 18 to be opened.

Figure 2:
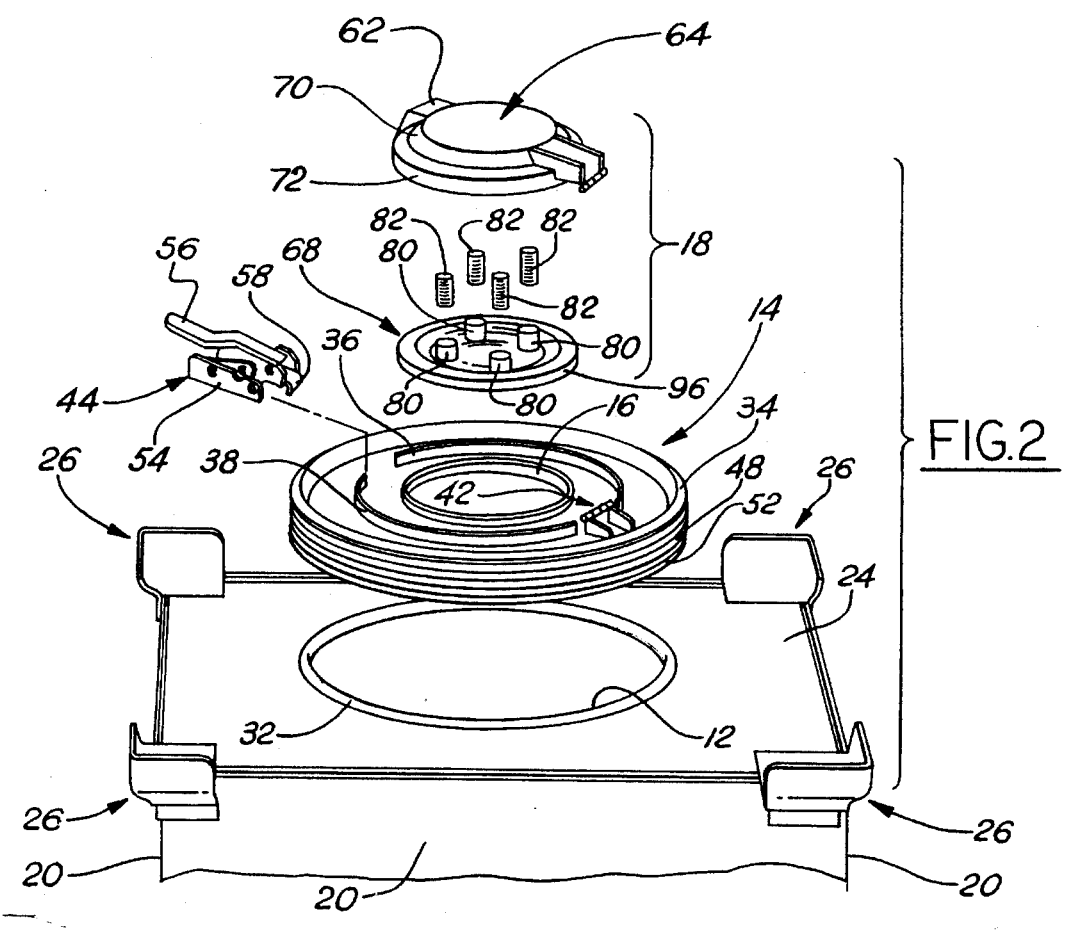
FIG. 2 is a fragmentary perspective view of the container with parts of the lid shown exploded.

As is illustrated in FIG. 2, vent lid or cap 18 has a circular support plate 64 attached by four spring assemblies 66 to a circular port cover 68 for sealing fill port opening 16 when lid 18 is closed, while enabling the seal to be controllably broken to relieve pressure build-up within container 10. When latched over port 16, support plate 64 provides fixed support backing to spring assemblies 66 for enabling each assembly 66 to press port cover 68 into sealing engagement with lip 46 of manway cover 14. To shield and protect spring assemblies 66 and port cover 68 from impact, plate 64 coaxially overlines cover 68. Preferably, the diameter of support plate 64 is greater than that of port cover 68 to more completely protect cover 68 and shield any worker nearby from direct exposure to vapor released from container 10 during venting. Support plate 64 is generally dish-shaped, having a downwardly inclined peripheral portion 70 to increase stiffness and impact resistance and terminates in a downwardly extending flange 72 which also strengthens plate 64 while further protecting and shielding port cover 68. As is illustrated more clearly in FIGS. 3–5, plate 64 has a first stiffener 74 extending crosswise of a second stiffener 76 for imparting additional rigidity and stiffness to plate 64.

Each spring assembly 66 is disposed outwardly from the center of port cover 68 for more effectively maintaining the seal between lid 18 and manway cover 14 by reducing the magnitude of bending moments port cover 68 is subjected to during a hydraulic shock, such as caused by a container drop. Preferably, as shown in phantom in FIG. 1, spring assemblies 66 are spaced outwardly from the center of port cover 68 equal distances and are equiangularly spaced from one another for more uniformly pressing port cover 68 against lip 46 of manway cover 14 to positively yet yieldably seal port opening 16.

As is shown more clearly in FIGS. 3–5, each spring assembly 66 has a first generally cylindrical well 78 secured to the underside of support plate 64 which is telescopically slidably received within a second generally cylindrical well 80 secured to port cover 68. A compression spring 82 is nested within wells 78, 80 of each spring assembly 66 for biasing port cover 68 against manway cover 14 to seal port opening 16 while allowing port cover 68 to controllably unseat to regulate the pressure within container 10. The axes of the four spring assemblies 66 are parallel. The port cover 68 may be displaced away from port opening 16 during venting along a direction substantially parallel to the axes of spring assemblies 66 for maintaining the port cover 68 in coaxial alignment with fill opening 16 and to cause port cover 68 to reseat when the desired pressure within container 10 has been achieved. To prevent disengagement, spring-well 78 has a radially outwardly projecting annular stop 84 which bears against a retainer ring 86 attached to the axially outer end of spring-well 80 when wells 78, 80 are fully extended (FIG. 5). The sidewalls of wells 78, 80 provide lateral support to springs 82 for preventing springs 82 from bending or buckling during use and to direct the force from springs 82 along the axis of wells 78, 80 against port cover 68 to seal port 16. The properties and characteristics of each spring 82 may be chosen so that the four spring assemblies 66 act together to apply sufficient force against port cover 68 to seal fill opening 16 even when cover 68 is subjected to impact or shock, yet enabling port cover 68 to unseat when the pressure within container 10 bearing against the interior surface of cover 68 exceeds a predetermined value to regulate the internal pressure of container 10.

The port cover 68 has a downwardly dished central portion 88 which is convex away from the support plate and is spherically shaped, that is, it is in the form of a segment of a sphere, except for four lands 90 which are spaced apart according to the spacing of spring assemblies 66. Each land 90 supports an end of a corresponding spring-well 80. The convex central portion 88 behaves in use as a shell, analogous to an eggshell, for increasing the capacity of port cover 68 to withstand the normal force loading (FIG. 3) such as experienced during a hydraulic shock without permanently deforming, as contrasted to a generally flat plate cover subjected to similar loading conditions. This dished construction also imparts increased rigidity to port cover 68 when loaded for preventing the cover 68 from flexing or otherwise deforming to maintain the integrity of the seal between cover 68 and lip 46 of manway cover 14.

Port cover 68 has an annular channel 92 bounding its periphery to strengthen cover 68 and for receiving an O-ring seal 94 therein. Channel 92 strengthens convex dished central portion 88 of cover 68. Seal ring 94 bears against lip 46 of manway cover 14 when port cover 68 is in the closed position to seal port 16. O-ring seal 94 may be constructed of Bethane™, Viton™, White Hypalon™, Teflon™ or other suitable gasket material impervious to the contents of container 10. The outer wall of channel 92 is a downwardly extending skirt 96 for generally coaxially encompassing lip 46 to prevent port cover 68, when in the closed position, from shifting radially relative to the axis of fill port opening 16 and breaking the seal with lip 46. If desired, a vent 98 can be provided in port cover 68 for equalizing the pressure within container 10 with that of the outside environment when lid 18 is latched in the closed position to prevent vacuum formation within container 10.

In use, with sealing gasket 52 received over lip 32 of container 10, manway cover 14 may be manipulated over container opening 12 until lip 32 is seated within flange 34. Lock ring 48 is placed around both lip 32 and flange 34, and bolt 50 is tightened securing manway cover 14 to container 10 and sealingly sandwiching sealing gasket 52 between lip 32 and flange 34. To completely seal manway opening 12, vent lid 18 is moved to the closed position and latched, drawing lid 18 downwardly over fill port opening 16 sealing O-ring 94 fluid tight against lip 46 of manway cover 14.

Should container 10 be dropped, support plate 64 of vent lid 18 protects port cover 68 from direct impact while spring assemblies 66 and dished central portion 88 of port cover 68 absorb the ensuing hydraulic shock of the contents of container 10 impacting against cover 68 to maintain the seal with port opening 16. However, in normal use, should the force of vapor within container 10 bearing against the interior surface of port cover 68 exceed the force of springs 82 biasing cover 68 into sealing engagement over fill opening 16, cover 68 will unseat, as depicted in FIG. 4, to relieve pressure buildup within container 10. When the pressure within container 10 has been reduced to the desired level, port cover 68 will return and seat on lip 46 resealing opening 16. The cover 68 may open only momentarily, or may open and close several times in rapid succession, to relieve pressure.

To open vent lid 18, latch handle 56 may be released to disengage catch 58 from boss 60 to allow lid 18 to be swung away from the closed position (FIG. 5). With vent lid 18 opened, container 10 may be filled or the contents of container 10 may be removed or inspected through fill port 16. To remove manway cover 14 from container 10, bolt 50 may be loosened to remove ring 48 allowing cover 14 to be lifted free of manway opening 12.

Preferably, manway cover 14, support plate 64 and port cover 68 are each of one-piece unitary construction providing strength, durability and impact resistance and are constructed of stainless steel, steel or another durable, strong material impervious to the contents of container 10.

While the present invention has been disclosed in connection with the preferred embodiments thereof, it should be understood that there may be other embodiments which fall within the spirit and scope of the invention and that the invention is susceptible to modification, variation and change without departing from the proper scope or fair meaning of the following claims.

What is claimed is:

1. A lid assembly for closing an opening in a wall of a container and regulating pressure in the container, said lid assembly comprising:

a cover, means for removably securing said cover to the container in sealed relation to said opening, said cover having a fill port, a vent cap for said fill port, said vent cap comprising a support plate and a port closure plate, means mounting said port closure plate to said support plate in generally parallel relation thereto with said support plate overlying and protecting said port closure plate, means for supporting said vent cap on said cover for movement from a first position in which said port closure plate sealingly engages said fill port to a second position in which said port closure plate completely disengages said fill port, said mounting means for said port closure plate comprising a plurality of spring units pressing said port closure plate into sealing engagement with said fill port when said vent cap is in said first position but yieldable in response to an excess of pressure in the container to permit said port closure plate to at least partially disengage said fill port and thereby vent the container, said fill port comprising an annular lip extending from said cover toward said port closure plate and terminating in an annular sealing edge, said port closure plate having a laterally outer peripheral portion defining an annular channel opening toward said port closure plate and terminating in an annular flange extending toward said cover in overlapped, telescoping relation with said lip when said vent cap is in said first position, and an annular sealing ring carried by said port closure plate in said channel, said sealing ring sealingly engaging said sealing edge of said lip when said vent cap is in said first position and said annular flange, because of its telescoping relation with said lip, preventing lateral shifting of said port closure plate and resultant breaking of the seal between said sealing edge of said lip and said sealing ring, said port closure plate having a central main body portion which is semi-spherically shaped and convex away from said support plate to enhance the capacity of the port closure plate to withstand internal container pressure and hydraulic shock without flexing or distorting.

2. A lid assembly as defined in claim 1, wherein said support plate has a laterally outer peripheral portion terminating in an annular flange encircling and protecting the annular flange of said port closure plate.

3. A lid assembly as defined in claim 2, wherein said port closure plate is circular, said spring units are disposed in equal angularly spaced relation around the center of said port closure plate, and said convex central main body portion of said port closure plate has flattened lands supporting said spring units.

4. A lid assembly as defined in claim 3, and further including means providing a vacuum vent in said port closure plate to preclude the development of a vacuum in the container.

* * * * *